UNITED STATES PATENT OFFICE.

ADOLFO DE CLAIRMONT, OF TOPEKA, KANSAS, ASSIGNOR OF ONE-HALF TO ALBRECHT MARBURG, OF TOPEKA, KANSAS.

FILLER COMPOUND FOR TIRES.

SPECIFICATION forming part of Letters Patent No. 698,454, dated April 29, 1902.

Application filed November 7, 1901. Serial No. 81,436. (No specimens.)

*To all whom it may concern:*

Be it known that I, ADOLFO DE CLAIRMONT, a citizen of the United States, residing at Topeka, in the county of Shawnee and State of Kansas, have invented certain new and useful Improvements in Filler Composition for Tires; and I do hereby declare the following to be a full, clear, and exact description of the invention, such as will enable others skilled in the art to which it appertains to make and use the same.

This invention relates to a new composition chiefly designed to prolong the life and period of usefulness of pneumatic tires and render them invulnerable and puncture-proof. In compounding this mixture I use the following ingredients or their substantial equivalents in about the proportions stated, *i. e.:* glue, one part; molasses, one part; water, one part; granulated cork, one part; resin, one-half part. The glue is placed in the water and allowed to stand until soft, the water being absorbed and the glue swelling and becoming jellied. This gelatinous mass is liquefied in a hot-water bath, after which the molasses is added boiling hot. This mixture is kept about at the boiling-point of water in the bath for thirty minutes, or thereabout, after which the granulated cork is added.

Glycerin may be used instead of or in combination with the glue, and the latter may be derived from boiling skins or any jelly-producing substance. As a substitute for the cork sponge, pith-cellulose, or other light material may be used.

The composition must be used hot and is filled into the tire in any desired way, preferably by being pumped therein. When the composition is cool and sets, which will be in about five to six hours, it will be found firm, elastic, and light.

While the composition is designed most especially for old and worn tires, it may be used as a filling for a casing of any make or character, being adaptable for light and heavy tires alike. A tire filled with the composition aforesaid is puncture-proof and possesses all the resiliency of a pneumatic tire and is far more serviceable.

The resin may be added at any time; but it is preferred to place it in the boiling mixture of glue and molasses and let it dissolve thoroughly before the addition of the cork or like material.

The composition has been found useful in filling truss-pads, cushions, and like articles.

The resin renders the composition more or less hard or elastic, according to the temperature, in addition to its function as a binder for the cork.

Having thus described the invention, what is claimed as new is—

1. A composition of matter for filling tires consisting of glue, molasses, water and granulated cork in about the proportions specified.

2. A composition of matter for filling tires consisting of glue, molasses, water, resin and granulated cork in about the proportions specified.

In testimony whereof I affix my signature in presence of two witnesses.

ADOLFO DE CLAIRMONT. [L. S.]

Witnesses:
 H. C. POHLMAN,
 M. W. COURTER.